(12) United States Patent
Evans et al.

(10) Patent No.: US 6,880,684 B1
(45) Date of Patent: Apr. 19, 2005

(54) FLOW REGULATOR FOR A GAS SHOCK ABSORBER

(76) Inventors: Walker Evans, P.O. Box 2469, Riverside, CA (US) 92516; Randy Anderson, P.O. Box 2469, Riverside, CA (US) 92516

( * ) Notice: Subject to any disclaimer, the term of this patent is extended or adjusted under 35 U.S.C. 154(b) by 0 days.

(21) Appl. No.: 10/621,906

(22) Filed: Jul. 18, 2003

(51) Int. Cl.[7] .................................................. F16F 9/34
(52) U.S. Cl. ..................... 188/319.2; 188/313; 188/314
(58) Field of Search ............................... 188/314, 315, 188/319.2, 313

(56) References Cited

U.S. PATENT DOCUMENTS

| | | | | |
|---|---|---|---|---|
| 3,528,531 A | * | 9/1970 | Watson et al. ............... | 188/315 |
| 4,515,253 A | * | 5/1985 | Itoh ............................ | 188/314 |
| 4,546,959 A | * | 10/1985 | Tanno ....................... | 267/64.15 |
| 4,732,244 A | * | 3/1988 | Verkuylen .................... | 188/318 |
| 4,928,799 A | * | 5/1990 | Zschiesche .................. | 188/314 |
| 5,085,298 A | * | 2/1992 | Sollami ....................... | 188/314 |
| 6,102,171 A | * | 8/2000 | Rottenberger et al. ... | 188/319.2 |
| 6,254,067 B1 | * | 7/2001 | Yih .......................... | 267/64.22 |

* cited by examiner

Primary Examiner—Robert A. Siconolfi
(74) Attorney, Agent, or Firm—Timothy Thut Tyson; Ted Masters; Freilich, Hornbaker & Rosen

(57) ABSTRACT

A flow regulator for a gas shock absorber is connected between the primary cylinder and the secondary cylinder. The flow regulator allows a user to adjust the rate of flow of fluid from the primary cylinder to the secondary cylinder thereby varying the damping properties of the shock absorber. The adjustment is effected by rotating one of a plurality of orifices of different sizes into the fluid flow path.

6 Claims, 8 Drawing Sheets

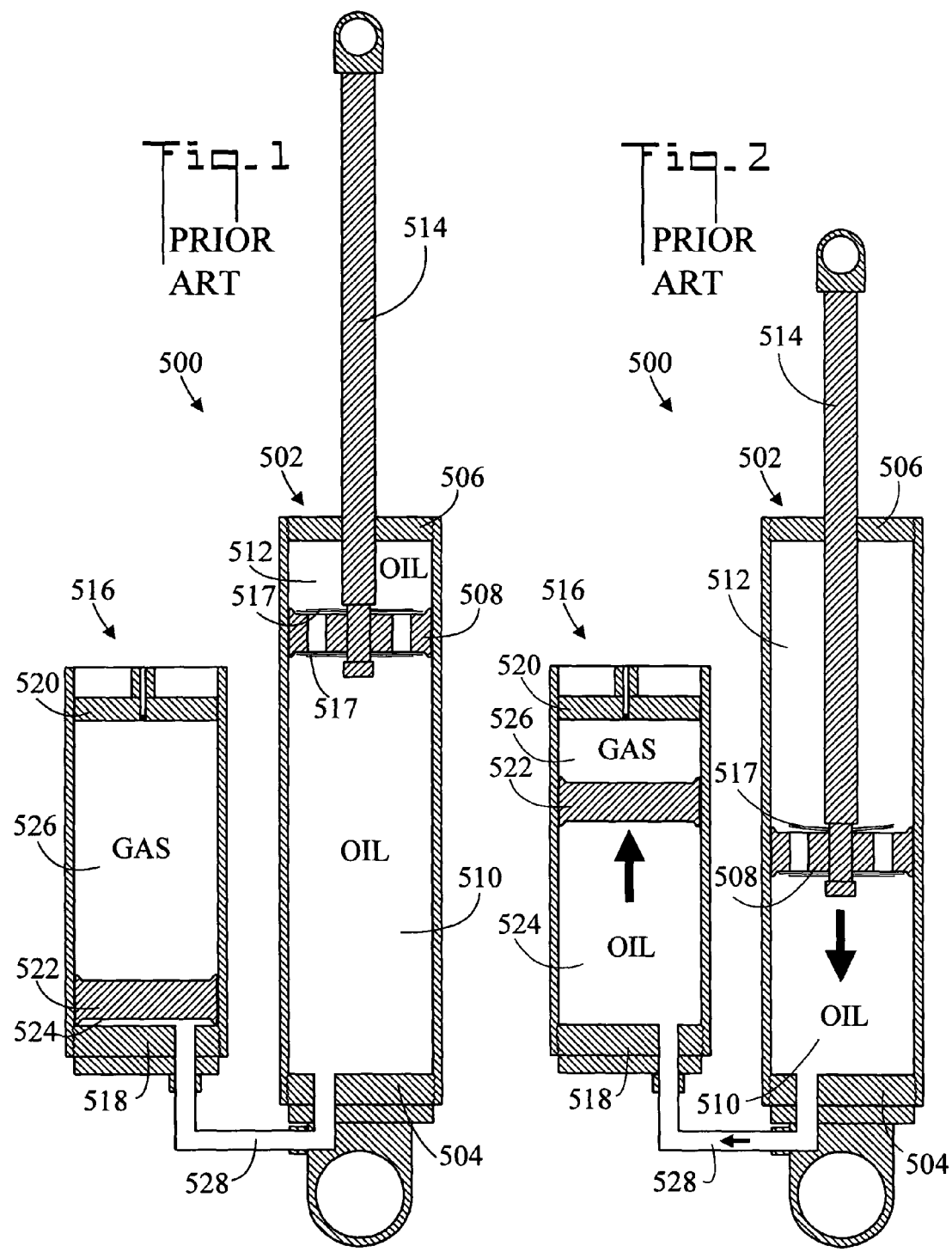

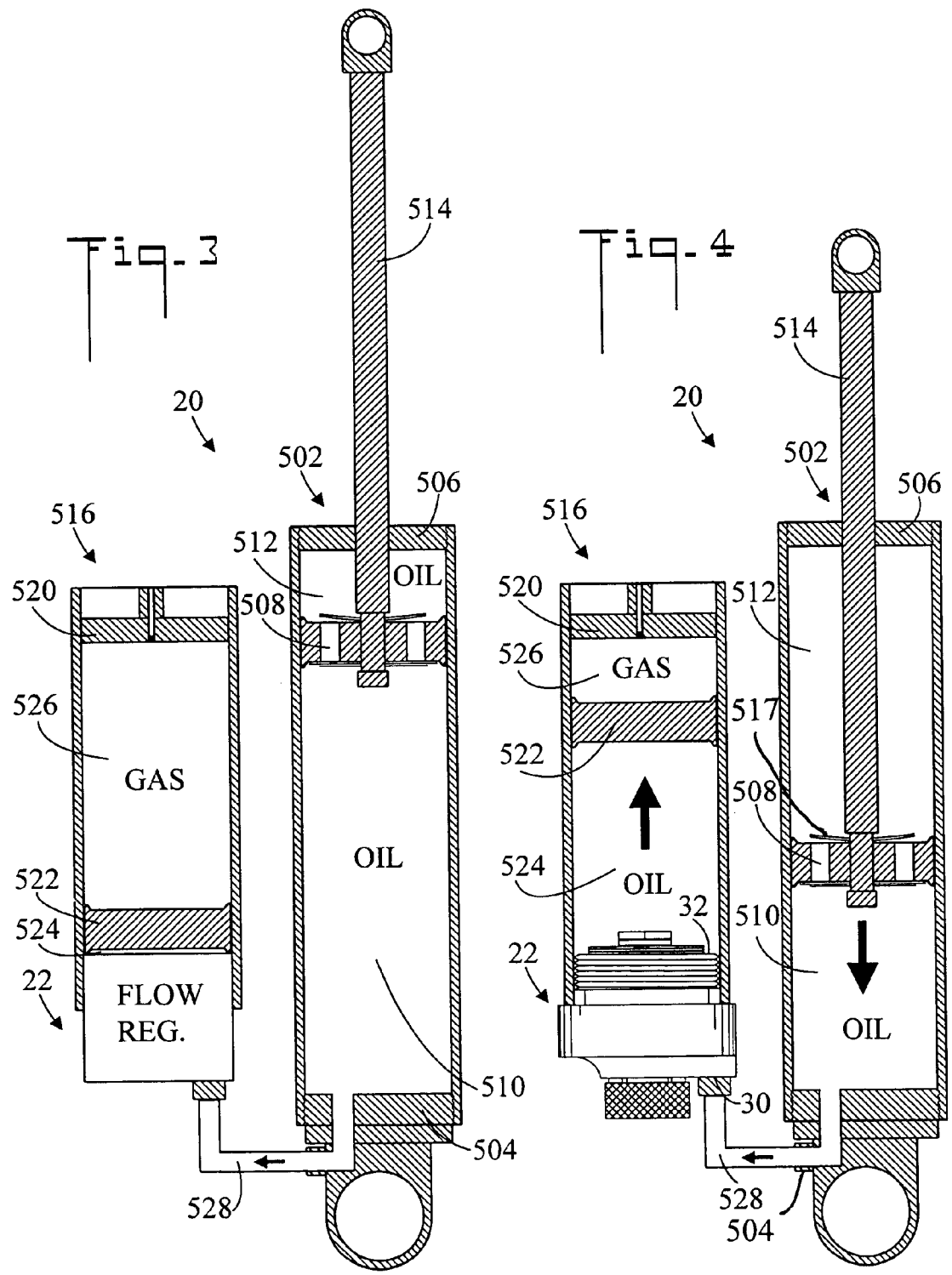

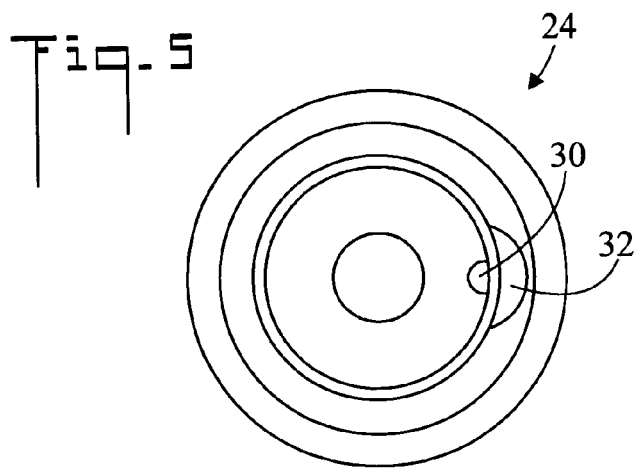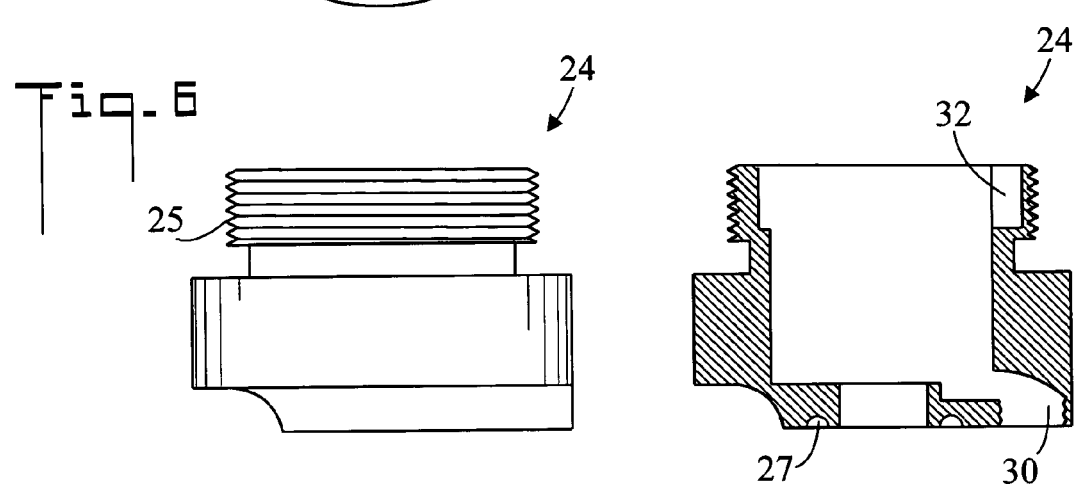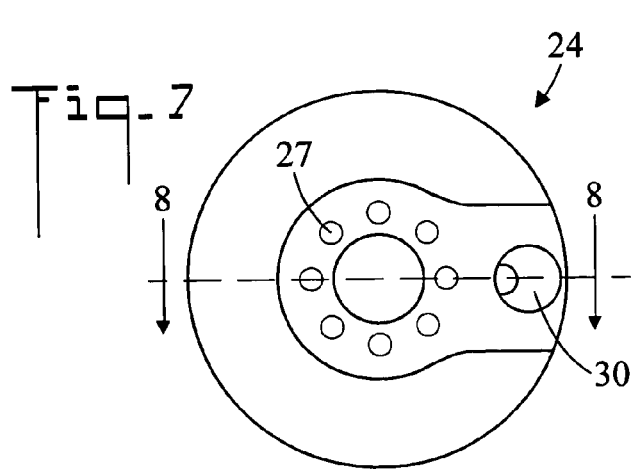

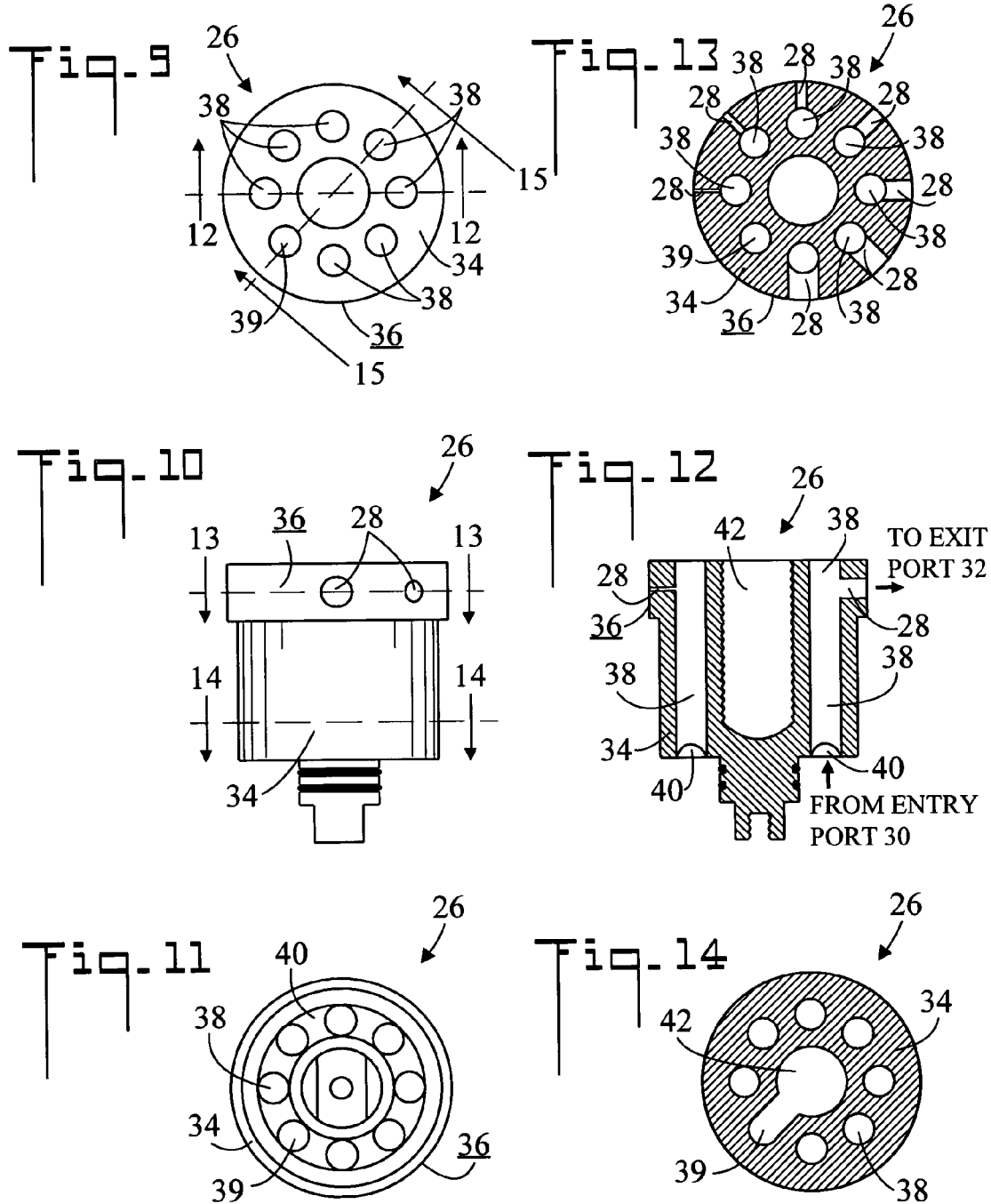

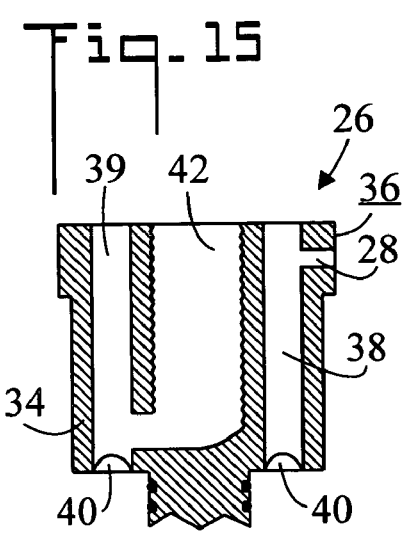
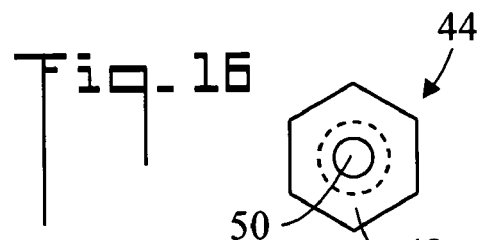
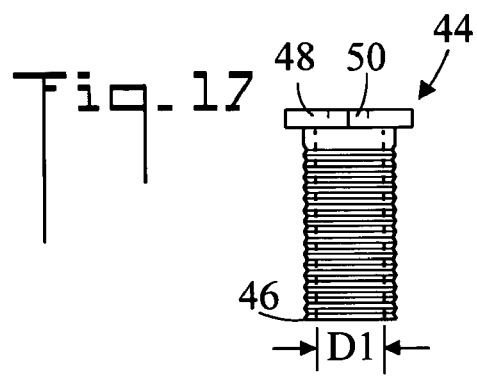
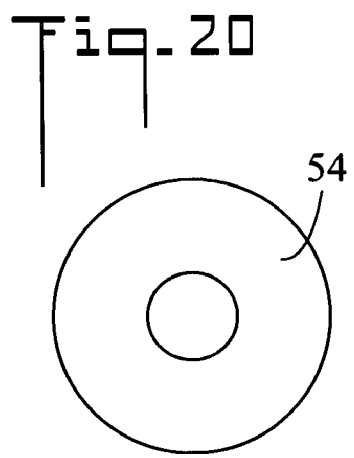
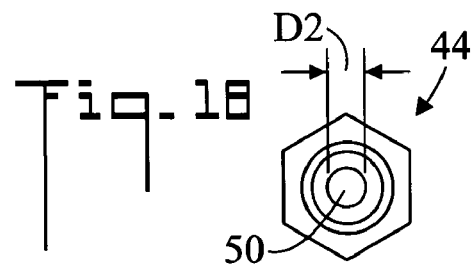
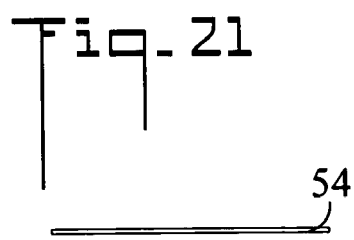
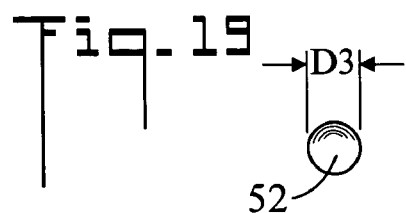

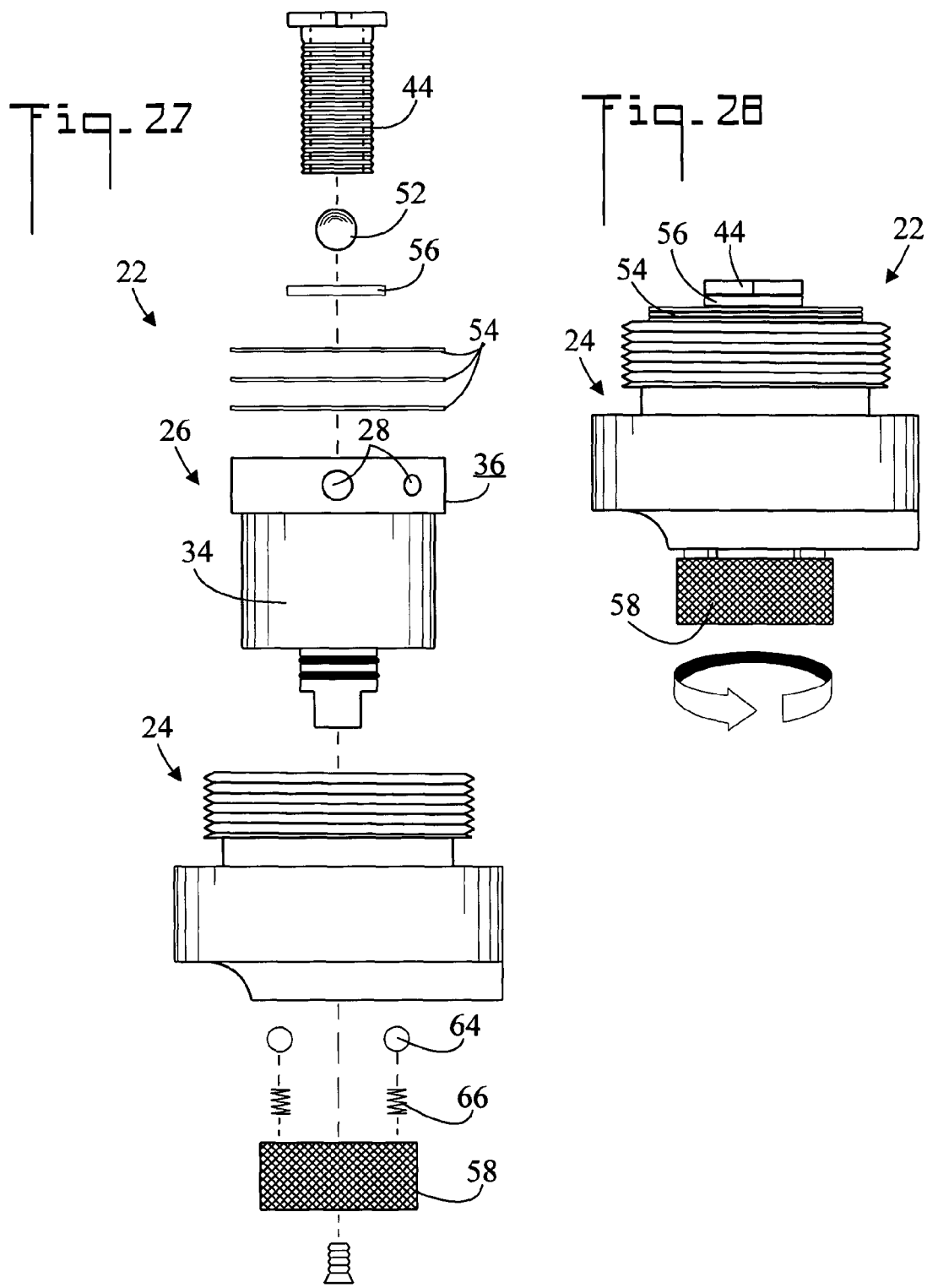

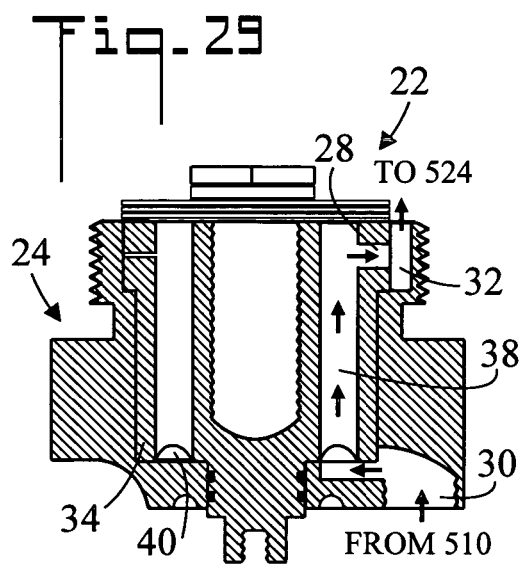
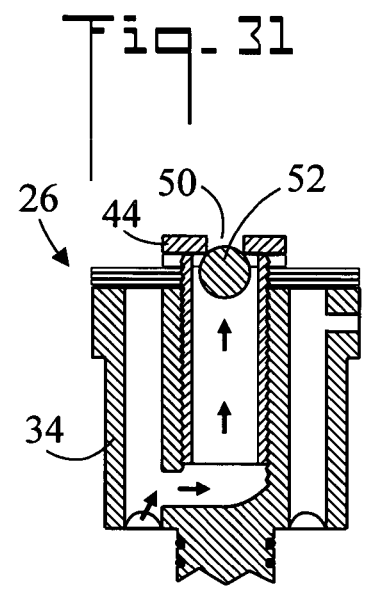
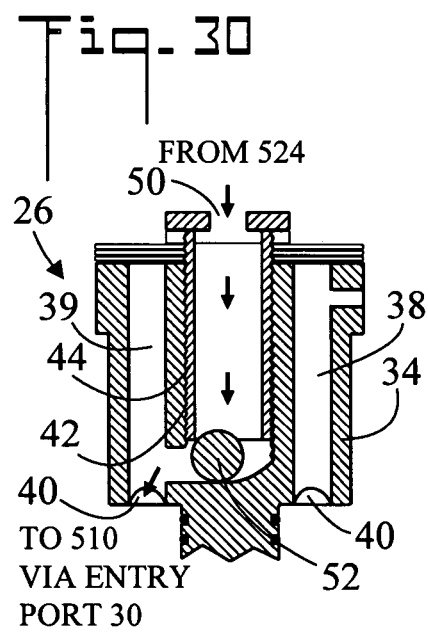
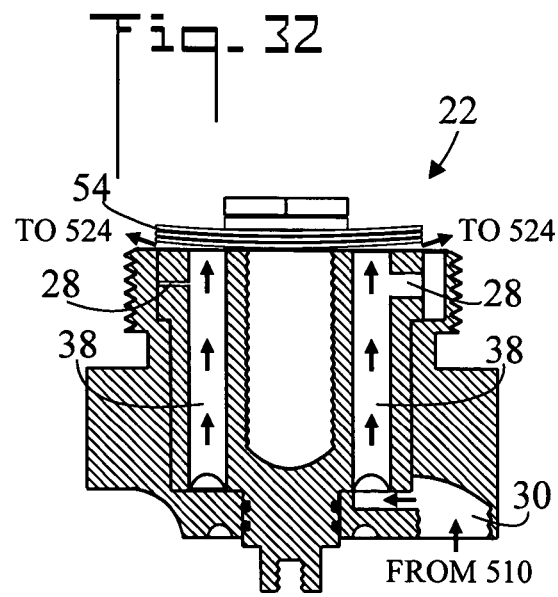

US 6,880,684 B1

FLOW REGULATOR FOR A GAS SHOCK ABSORBER

TECHNICAL FIELD

The present invention generally pertains to shock absorbers, and more particularly to a gas shock absorber in which a flow regulator permits selective adjustment of the damping properties of the shock absorber.

BACKGROUND OF THE INVENTION

Gas shock absorbers are well known in the art. These shock absorbers include a primary cylinder which is connected to a secondary cylinder. The primary cylinder contains a substantially incompressible fluid such as oil, and the secondary cylinder contains a compressible fluid such as a gas. In use, the gas is alternatingly compressed and expanded by the action of the primary cylinder, thereby providing a desired level of damping response. One of the factors which determines the characteristics of the damping is the size of the passageway between the primary and secondary cylinders. A large passageway allows a fast interaction between the cylinders. A small passageway only allows a slow interaction.

The size of the passageway may be fixed or adjustable. In many situations, a fixed size is useful. In other situations, an adjustable passageway is preferred. The size of the passageway is effectively adjusted using a valve. The most common valves are needle valves but other types of valves are sometimes used.

For example, U.S. Pat. No. 4,153,237 shows a hydrapneumatic suspension unit for a vehicle having first and second chambers separated by a valve assembly for controlling the flow of liquid between them. The first chamber is filled with a liquid and includes a slidably mounted piston connected by a linkage to the road wheel. The second chamber has a first compartment containing the liquid and a second compartment containing a compressible medium separated by a floating piston. The valve assembly includes a needle damping valve 37, a low-restriction check valve for permitting one-way flow of liquid from the first to the second chamber, and a damping bypass valve for enabling quick return of liquid from the second chamber to the first chamber.

U.S. Pat. No. 4,311,302 illustrates a shock absorber device, having a piston rod unit that is axially displaceable through a cylinder member from one end toward the other end. The cylinder forms a variable volume working chamber containing a first fluid. A spring chamber is in communication with the working chamber so that the first fluid can flow between the two chambers. A pressurized second fluid is contained within the spring chamber separate from the first fluid and acts on the first fluid to bias the piston rod unit out of the working chamber. When the piston rod unit is moved into the working chamber and approaches an inner end position, it forms at least in part a damping chamber which decelerates the movement of the piston rod unit. The passageway between the two chambers is fixed. No external adjustment of the rate of damping is available.

U.S. Pat. No. 4,620,694 discloses a hydraulic suspension system for a motorcycle having an adjustable shock absorber unit located between the rear wheel and main frame. The first of four adjustments is an externally accessible fillervalve enabling the rider to adjust gas pressure in one chamber to vary spring rate. A second adjustment is a valve for varying the rate of hydraulic fluid flow from a main chamber through a main piston to a third chamber to obtain the desired rate of upper wheel travel. A third adjustment is an adjustable pressure relief valve for limiting differential pressure between fluid in the main chamber and in the third chamber under conditions of severe impact. A fourth adjustment is a valve for varying the fluid flow from a fourth chamber to the third chamber during extension.

U.S. Pat. No. 4,921,224 illustrates a hydro-pneumatic suspension system for a car having a main housing with a damping device and a sub housing having a metal bellows. A high-pressure compressed gas is sealed inside the bellows. A passageway connects the main housing to the subhousing. No means is provided for adjusting the size of the passageway.

U.S. Pat. No. 4,958,706 describes an adjustable shock absorber having a needle type adjusting screw in the flow path between two chambers for altering the characteristics of the flow path.

U.S. Pat. No. 5,351,790 depicts a hydraulically adjustable suspension apparatus for an automobile which has a proportional type of solenoid operated valve assembly for controlling the pressure or flow rate of a pressurized fluid introduced into a cylinder tube through a fluid passage.

U.S. Pat. No. 4,732,244 shows a hydraulic shock damper assembly for the rear wheel of a rally-cross motorcycle and other vehicles. The hydraulic cylinder is connected through a flow channel to a dashpot having a partition element enclosing a pressurized fluid such as nitrogen. A plurality of identical apertures 41 are provided through a disk 40 for adjusting the total aperture between the hydraulic cylinder and dashpot. A control plate 43 is rotated by a knob 45 to adjust the number of apertures in the passageway.

Under harsh conditions such as encountered in the operation of snowmobiles and all-terrain vehicles, needle valves have limited utility because they tend to break. The valve of U.S. Pat. No. 4,732,244 is an example of a valve for use in harsh conditions that is not a needle valve. However, the control plate used is relatively thin. A valve for adjusting a gas shock absorber that is durable would be a useful improvement.

SUMMARY OF THE INVENTION

The present invention is directed to a flow regulator for a gas shock absorber. The flow regulator is placed between a primary cylinder or housing and a secondary cylinder or housing. The flow regulator allows selective adjustment of the damping properties of the shock absorber by placing one of a plurality of different sized orifices in the fluid flow path between the two cylinders. The selected orifice determines the rate at which fluid may flow from the primary cylinder to the secondary cylinder, and therefore the damping properties of the shock absorber. The flow regulator includes a one way valve which permits the fluid to flow back from the secondary cylinder to the primary cylinder, and a safety valve which opens to provide a bypass flow when a predetermined level of high pressure is reached in the primary cylinder.

In accordance with a preferred embodiment of the invention, a flow regulator is connected between the output chamber of the primary cylinder and the input chamber of the secondary cylinder. The flow regulator controls the flow of incompressible fluid such as oil between the output and input chambers. The flow regulator includes a body which receives a flow control member. The flow control member has a plurality of orifices of different sizes. The flow control member may be selectively positioned to cause the incompressible fluid to flow through one of the orifices from the output chamber of the primary cylinder to the input chamber of the secondary cylinder. The size of the selected orifice determines the rate of flow of the incompressible fluid, and therefore the damping properties of the shock absorber.

In accordance with an aspect of the invention, the flow control regulator includes a one way valve which permits the incompressible fluid to flow back from the secondary cylinder to the primary cylinder.

In accordance with another aspect of the invention, the flow control regulator also includes a safety valve which allows direct fluid flow from the primary cylinder to the secondary cylinder when a high pressure conditions exists.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 1 is a cross sectional view of a prior art gas shock absorber;

FIG. 2 is a cross sectional view of the prior art shock absorber being compressed;

FIG. 3 is a cross sectional view of a shock absorber in accordance with the present invention having a flow regulator;

FIG. 4 is a cross sectional view of the shock absorber being compressed;

FIG. 5 is a top plan view of the body of the flow regulator;

FIG. 6 is a side elevation view of the body;

FIG. 7 is a bottom plan view of the body;

FIG. 8 is a cross sectional view along the line 8—8 of FIG. 7;

FIG. 9 is a top plan view of a flow control member;

FIG. 10 is a side elevation view of the flow control member;

FIG. 11 is a bottom plan view of the flow control member;

FIG. 12 is a cross sectional view along the line 12—12 of FIG. 9;

FIG. 13 is a cross sectional view along the line 13—13 of FIG. 10;

FIG. 14 is a cross sectional view along the line 14—14 of FIG. 10;

FIG. 15 is a cross sectional view along the line 15—15 of FIG. 9;

FIG. 16 is a top plan view of a hollow member;

FIG. 17 is a side elevation view of the hollow member;

FIG. 18 is a bottom plan view of the hollow member;

FIG. 19 is a side elevation view of a spherical member;

FIG. 20 is a top plan view of a washer;

FIG. 21 is a side elevation view of the washer;

FIG. 27 is an exploded view of the flow regulator;

FIG. 28 is a side elevation view of the flow regulator;

FIG. 29 is a cross sectional view of fluid flow within the flow regulator;

FIG. 30 is a cross sectional view of fluid flow within the cylinder, when the fluid is flowing back from the secondary housing to the primary housing;

FIG. 31 is a cross sectional view of a one way valve feature of the flow regulator; and, FIG. 32 is a cross sectional view of a safety valve.

DETAILED DESCRIPTION OF THE INVENTION

Figure 22:
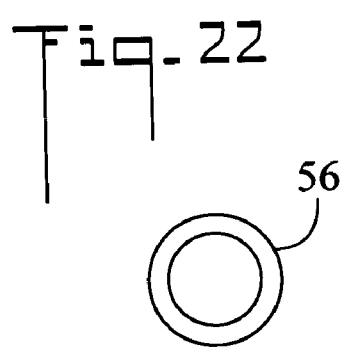
FIG. 22 is a top plan view of a second washer.

FIG. 1 illustrates a cross sectional view of a prior art gas shock absorber, generally designated as 500. Shock absorber 500 includes a primary housing 502 having a primary internal cavity containing a fluid such as an oil, a first end 504, and an opposite second end 506. The fluid is incompressible under the operating conditions of shock absorber 500. A piston assembly 508 is disposed within the primary internal cavity, the piston assembly 508 longitudinally traveling within the primary internal cavity, the piston assembly 508 partitioning the primary internal cavity into a first chamber 510 disposed adjacent first end 504 of primary housing 502, and a second chamber 512 disposed adjacent second end 506 of primary housing 502. It may be appreciated that as piston assembly 508 longitudinally travels within the primary internal cavity, the relative sizes of first chamber 510 and second chamber 512 inversely change (refer also to FIG. 2). A shock rod 514 is connected to piston assembly 508, shock rod 14 passing through second end 506 of primary housing 502.

Piston assembly 508 includes bypass valves 517 which are necessary to allow the incompressible fluid to bypass piston assembly 508 so that piston assembly 508 can move up and down within the primary internal cavity of primary housing 502. Bypass valves 517 comprise thin washers of various diameters which bend to allow the passage of fluid between first chamber 510 and second chamber 512, and visa versa. The number and size of the washers may be varied to "tune" the response of gas shock absorber 500.

Shock absorber 500 also includes a secondary housing 516 having a secondary internal cavity, a first end 518, and an opposite second end 520. A piston 522 is disposed within the secondary internal cavity, piston 522 longitudinally traveling within the secondary internal cavity, the piston 522 partitioning the secondary internal cavity into a first chamber 524 disposed adjacent first end 518 of secondary housing 516, and a second chamber 526 disposed adjacent second end 520 of secondary housing 516. Again it may be appreciated that as piston 522 longitudinally travels within the secondary internal cavity, the relative sizes of first chamber 524 and second chamber 526 inversely change (refer also to FIG. 2). Second chamber 526 contains a compressible fluid such as a gas. In practice the compressible fluid is pressurized to a desired level such as 200 psi. Nitrogen is the gas that is typically used in gas shock absorbers.

The first chamber 510 of primary housing 502 is connected by a passage 528 such as tubing to the first chamber 524 of secondary housing 516 so the incompressible fluid may flow between the two first chambers.

FIG. 2 is a cross sectional view of the prior art shock absorber 500 being compressed. As piston assembly 508 moves toward first end 504 of primary housing 502, some of the incompressible fluid moves past bypass valves 517 and some is forced out of first chamber 510 and into first chamber 524 of secondary housing 516 through passage 528. Piston 522 is thereby forced toward second end 520 of secondary housing 516 compressing the gas in second chamber 526. The action of the pistons within the two housings combine to provide the desired damping effect.

FIG. 3 illustrates a cross sectional view of a shock absorber in accordance with the present invention, generally designated as 20. Shock absorber 20 includes the elements of prior art shock absorber 500, and additionally includes a flow regulator generally designated as 22. Flow regulator 22 is connected between first chamber 510 of primary housing 502 and first chamber 524 of secondary housing 516. Flow regulator 22 controls the flow of incompressible fluid between first chamber 510 of primary housing 502 and first chamber 524 of secondary housing 516. Flow regulator 22 includes a body 24 (refer to FIGS. 5–8) which receives a flow control member 26 (refer to FIGS. 9–15). Flow control member has a plurality of orifices 28 of different sizes (refer to FIG. 13). Flow control member 26 may be selectively positioned within body 24 to cause the incompressible fluid to flow through one of the orifices 28 from first chamber 510 of primary housing 502 to the first chamber 524 of secondary housing 516. By selecting a particular orifice 28, the damping properties of shock absorber 20 may be selectively changed by a user.

FIG. 4 is a cross sectional view of shock absorber 20 being compressed. As piston assembly 508 moves toward first end 504 of primary housing 502, some of the incompressible fluid moves past bypass valves 517 and some is forced from first chamber 510 of primary housing 502 through passage 528 to flow regulator 22 and then to first chamber 524 of secondary housing 516. The incoming incompressible fluid forces piston 522 toward second end 520 of secondary housing 516, thereby compressing the gas in second chamber 526. Through orifice 28 selection, flow regulator 22 controls the rate at which the incompressible fluid can flow into first chamber 524 of secondary housing 516.

FIGS. 5–7 are top plan, side elevation, and bottom plan views, respectively, of body 24 only of flow regulator 22. FIG. 8 is a cross sectional view along the line 8—8 of FIG. 7. Body 24 includes an entry port 30 and an exit port 32. Entry port 30 is connected by passage 528 to first chamber 510 of primary housing 502 (see FIG. 4). Exit port 32 directly opens into first chamber 524 of second housing 516. Body 24 includes threads 25 for installation in secondary housing 516. Body 24 also includes a plurality of circularly spaced dimples 27 which are part of a detent mechanism (refer to FIG. 27).

FIGS. 9–11 are top plan, side elevation, and bottom plan views, respectively, of flow control member 26 only of flow regulator 22. Flow control member 26 comprises a cylinder 34 having an outside surface 36 and a plurality of bores 38. Each bore 38 is connected to outside 36 surface by one of the orifices 28 (refer also to FIG. 13). As used herein, connected means that there exists a passage through which the incompressible fluid may flow. Cylinder 34 may be selectively rotated within body 24 (FIGS. 5–7) so that one of the orifices 28 aligns with exit port 32. When so aligned by selection, the incompressible fluid flows from first chamber 510 of primary housing 502 (FIG. 4), through passage 528, through entry port 30, through the bore 38 connected to the aligned orifice 28, through the aligned orifice 28, through exit port 32, and into first chamber 524 of secondary housing 516 (refer also to FIG. 29). The different sized orifices 28 permit the selection of a different incompressible fluid flow rate.

FIG. 12 is a cross sectional view along the line 12—12 of FIG. 9. In the figure, cylinder 34 has been rotated so that the orifice 28 on the right has been selected to pass the incompressible fluid. When installed in body 24, this orifice will align with exit port 32. It is further noted that cylinder 34 includes a circular channel 40 which connects entry port 30 with each bore 38 (also refer to FIG. 11). As will be discussed later, this feature allows the incompressible fluid to freely flow back from the secondary housing 516 to the primary housing 502.

FIG. 13 is a cross sectional view along the line 13—13 of FIG. 10 showing one orifice 28 connected to each bore 38.

In the shown embodiment, seven orifices 28 are circumferentially spaced around cylinder 34. The smallest orifice 28 provides the least damping effect of secondary housing 516, while the largest orifice 28 provides the most damping effect of secondary housing 516. It is noted that an additional no orifice bore 39 does not connect to an associated orifice 28. Therefore, should cylinder 34 be rotated so that exit 32 port aligns with no orifice bore 39, no incompressible fluid can flow through flow regulator 20. No orifice bore 39 also plays a role in allowing the incompressible fluid to freely flow back from the secondary housing 516 to the primary housing 502.

FIG. 14 is a cross sectional view along the line 14—14 of FIG. 10. No orifice bore 39 is connected to an aperture 42 which is centrally disposed in cylinder 34. In the shown embodiment, aperture 42 is threaded.

FIG. 15 is a cross sectional view along the line 15—15 of FIG. 9. No orifice bore 39 is connected to aperture 42 and circular channel 40.

FIGS. 16–18 are top plan, side elevation, and bottom plan views, respectively, of a hollow member or threaded screw 44. Hollow member 44 has a first inside diameter D1 and is accepted by aperture 42 (refer to FIGS. 12, 14, 30, and 31). Hollow member 44 has an open end 46 and an opposite head end 48. Head end 48 has a hole 50 which has a second diameter D2 which is less than first inside diameter D1.

FIG. 19 is a side elevation view of a spherical member 52 such as a ball bearing. Spherical member 52 is disposed within threaded aperture 42 and hollow member 44. Spherical member 52 has a third diameter D3 which is less than first inside diameter D1 and greater than second diameter D2.

FIGS. 20 and 21 are top plan and side elevation views respectively of a bypass washer 54.

Figure 23:
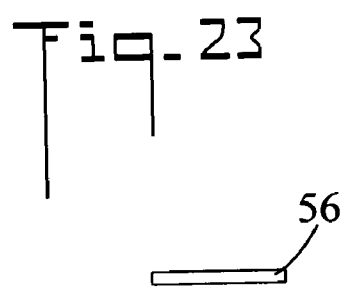
FIG. 23 is a side elevation view of the second washer.

FIGS. 22 and 23 are top plan and side elevation views respectively of a second washer 56.

Figure 24:
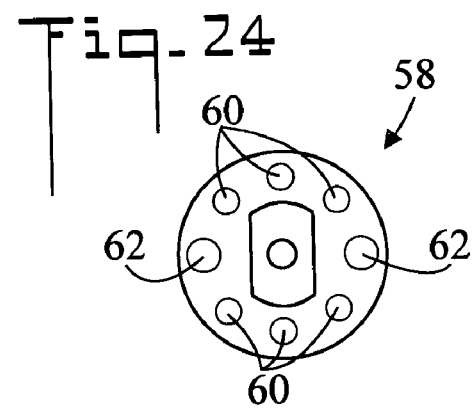
FIG. 24 is a top plan view of a rotatable member.
Figure 25:
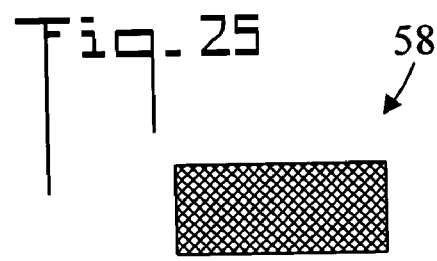
FIG. 25 is a side elevation view of the rotatable member.
Figure 26:
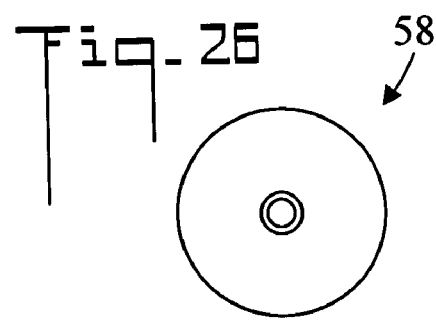
FIG. 26 is a bottom plan view of the rotatable member.

FIGS. 24–26 are top plan, side elevation, and bottom plan views, respectively, of a rotatable member 58 such as a knob. Rotatable member 58 includes a plurality of circularly spaced dimples 60 and two holes 62. Rotatable member 58 is connected to cylinder 34 (FIGS. 9–11) of flow control member 26, and is used to rotate cylinder 34 within body 24 (refer also to FIG. 27).

FIG. 27 is an exploded view of flow regulator 22. Hollow member 44 accepts spherical member 52, and is installed in aperture 42 using washer 56 and three bypass washers 54. A detent mechanism is connected between rotatable member 58 and body 24, so that, using rotatable member 58, cylinder 34 may be selectively rotated to a flow position corresponding to one of the orifices 28, wherein the detent mechanism urges cylinder 34 to remain in the selected flow position. The detent mechanism includes ball bearings 64 and springs 66 which fit into holes 62. As rotatable member 44 is rotated, ball bearings 64 enter one of the dimples 60 in rotatable member 58 and one of the dimples 27 in body 24, thereby urging cylinder 34 to remain in the selected position. A hard rotation can overcome the detent action, and rotate cylinder 34 to another position within body 24.

FIG. 28 is a side elevation view of the assembled flow regulator 22.

FIG. 29 is a cross sectional view of fluid flow within flow regulator 22. Also referring to FIG. 4, the incompressible fluid flows from first chamber 510 of primary housing 502, through passage 528, through entry port 30, through selected bore 38, through selected orifice 28, through exit port 32, and into first chamber 524 of secondary housing 516.

FIG. 30 is a cross sectional view of fluid flow within aperture 42 of cylinder 34, when the fluid is flowing back from secondary housing 516 to primary housing 502. Flow regulator 22 includes a one way valve which permits the incompressible fluid to freely flow or rapidly return from first chamber 524 of secondary housing 516 to first chamber 510 of primary housing 502. The incompressible fluid may flow from first chamber 524 of secondary housing 516, through hole 50 in hollow member 44, through hollow member 44, through no orifice bore 39, through circular channel 40, through entry port 30, and into first chamber 510 of primary housing 502. It is noted that for flow in the above described direction, the structure is such that the incompressible fluid flows around spherical member 52.

FIG. 31 is a cross sectional view of the one way feature of flow regulator 22. In the forward direction of fluid flow, i.e., primary housing 510 to secondary housing 516, the incompressible fluid cannot flow though hole 50 in hollow member 44. This is because for forward fluid flow, spherical member 50 lodges in hole 50 to prevent the incompressible fluid from flowing from entry port 30 to first chamber 524 of second housing 516 via hollow member 44.

FIG. 32 is a cross sectional view of a safety valve. Flow regulator includes a safety valve which opens allowing the incompressible fluid to flow from entry port 30 to first chamber 524 of secondary housing 516 when first chamber 510 of primary housing 502 experiences a predetermined pressure level. That is, should the pressure in first chamber 510 of primary housing 502 become too high, the safety value will permit the incompressible fluid to flow directly into first chamber 524 of secondary housing 516 without going through one of the orifices 38.

The safety valve includes at least one bypass washer 54 which covers one end of bores 28. When a predetermined high pressure level is reached, bypass washer 54 bends to allow the incompressible fluid to travel from entry port 30 through each of bores 38 and 39, and into first chamber 524 of secondary housing 516.

The preferred embodiments of the invention described herein are exemplary and numerous modifications, variations, and rearrangements can be readily envisioned to achieve an equivalent result, all of which are intended to be embraced within the scope of the appended claims.

What is claimed is:

1. A shock absorber, comprising:

a primary housing having a primary internal cavity containing a fluid, a first end, and an opposite second end;

a piston assembly disposed within said primary internal cavity, said piston assembly traveling within said primary internal cavity, said piston assembly partitioning said primary internal cavity into a first chamber disposed adjacent to said first end of said primary housing, and a second chamber disposed adjacent to said second end of said primary housing;

a shock rod connected to said piston assembly, said shock rod passing through said second end of said primary housing;

a secondary housing having a secondary internal cavity, a first end, and an opposite second end;

a piston disposed within said secondary internal cavity, said piston traveling within said secondary internal cavity, said piston partitioning said secondary internal cavity into a first chamber disposed adjacent to said first end of said secondary housing, and a second chamber disposed adjacent to said second end of said secondary housing;

said second chamber containing a compressible fluid;

a flow regulator connected between said first chamber of said primary housing and said first chamber of said secondary housing, said flow regulator controlling a flow of said fluid between said first chamber of said primary housing and said first chamber of said secondary housing;

said flow regulator including a body which receives a flow control member;

said flow control member having a plurality of orifices of different sizes;

wherein said flow control member may be selectively positioned to cause said fluid to flow through one of said orifices from said first chamber of said primary housing to said first chamber of said secondary housing;

said body having an entry port and an exit port;

said flow control member including a cylinder having an outside cylindrical surface and a plurality of bores, said plurality of orifices disposed upon said outside cylindrical surface, each said bore connected to said outside cylindrical surface by one of said orifices; and, wherein said cylinder may be selectively rotated so that one of said orifices aligns with said exit port, so that said fluid flows from said first chamber of said primary housing, through said entry port, through said bore connected to said aligned orifice, through said aligned orifice, through said exit port, and into said first chamber of said secondary housing.

2. A shock absorber, comprising:

a primary housing having a primary internal cavity containing a fluid, a first end, and an opposite second end;

a piston assembly disposed within said primary internal cavity, said piston assembly traveling within said primary internal cavity, said piston assembly partitioning said primary internal cavity into a first chamber disposed adjacent to said first end of said primary housing, and a second chamber disposed adjacent to said second end of said primary housing;

a shock rod connected to said piston assembly, said shock rod passing through said second end of said primary housing;

a secondary housing having a secondary internal cavity, a first end, and an opposite second end;

a piston disposed within said secondary internal cavity, said piston traveling within said secondary internal cavity, said piston partitioning said secondary internal cavity into a first chamber disposed adjacent to said first end of said secondary housing, and a second chamber disposed adjacent to said second end of said secondary housing;

said second chamber containing a compressible fluid;

a flow regulator connected between said first chamber of said primary housing and said first chamber of said secondary housing, said flow regulator controlling a flow of said fluid between said first chamber of said primary housing and said first chamber of said secondary housing;

said flow regulator including a body which receives a flow control member;

said flow control member having a plurality of orifices of different sizes;

wherein said flow control member may be selectively positioned to cause said fluid to flow through one of said orifices from said first chamber of said primary housing to said first chamber of said secondary housing;

said body having an entry port and an exit port;

said flow control member including a cylinder having an outside surface and a plurality of bores, each said bore connected to said outside surface by one of said orifices;

wherein said cylinder may be selectively rotated so that one of said orifices aligns with said exit port, so that said fluid flows from said first chamber of said primary housing, through said entry port, through said bore connected to said aligned orifice, through said aligned orifice, through said exit port, and into said first chamber of said secondary housing; and, said cylinder including a circular channel which connects said entry port with each of said bores.

3. A shock absorber, comprising:

a primary housing having a primary internal cavity containing a fluid, a first end, and an opposite second end;

a piston assembly disposed within said primary internal cavity said, piston assembly traveling within said primary internal cavity, said piston assembly partitioning said primary internal cavity into a first chamber disposed adjacent to said first end of said primary housing, and a second chamber disposed adjacent to said second end of said primary housing;

a shock rod connected to said piston assembly, said shock rod passing through said second end of said primary housing;

a secondary housing having a secondary internal cavity, a first end, and an opposite second end;

a piston disposed within said secondary internal cavity, said piston traveling within said secondary internal cavity, said piston partitioning said secondary internal cavity into a first chamber disposed adjacent to said first end of said secondary housing, and a second chamber disposed adjacent to said second end of said secondary housing;

said second chamber containing a compressible fluid;

a flow regulator connected between said first chamber of said primary housing and said first chamber of said secondary housing, said flow regulator controlling a flow of said fluid between said first chamber of said primary housing and said first chamber of said secondary housing;

said flow regulator including a body which receives a flow control member;

said flow control member having a plurality of orifices of different sizes;

wherein said flow control member may be selectively positioned to cause said fluid to flow through one of said orifices from said first chamber of said primary housing to said first chamber of said secondary housing;

said body having an entry port and an exit port;

said flow control member including a cylinder having an outside surface and a plurality of bores, each said bore connected to said outside surface by one of said orifices;

wherein said cylinder may be selectively rotated so that one of said orifices aligns with said exit port, so that said fluid flows from said first chamber of said primary housing, through said entry port, through said bore connected to said aligned orifice, through said aligned orifice, through said exit port, and into said first chamber of said secondary housing;

a one way valve which permits said fluid to flow from said first chamber of said secondary housing to said first chamber of said primary housing;

said one way valve including:

said cylinder including a circular channel which connects said entry port with each of said bores;

a no orifice bore which is not connected to a said orifice;

an aperture centrally disposed in said cylinder, said aperture connected to said no orifice bore;

a hollow member having an first inside diameter accepted by said aperture, said hollow member having an open end and an opposite head end, said head end having a hole having a second diameter less than said first inside diameter;

a spherical member disposed within said aperture, said spherical member having a third diameter less than said first inside diameter and greater than said second diameter;

wherein said fluid may flow from said first chamber of said secondary housing, through said hole in said hollow member, through said hollow member, through said no orifice bore, through said circular channel, through said entry port, and into said first chamber of said primary housing; and, wherein said spherical member lodges in said hole to prevent said fluid from flowing from said entry port to said first chamber of said secondary housing via said hollow member.

4. A shock absorber, comprising:

a primary housing having a primary internal cavity containing a fluid, a first end, and an opposite second end;

a piston assembly disposed within said primary internal cavity said piston assembly traveling within said primary internal cavity, said piston assembly partitioning said primary internal cavity into a first chamber disposed adjacent to said first end of said primary housing, and a second chamber disposed adjacent to said second end of said primary housing;

a shock rod connected to said piston assembly, said shock rod passing through said second end of said primary housing;

a secondary housing having a secondary internal cavity a first end, and an opposite second end;

a piston disposed within said secondary internal cavity said piston traveling within said secondary internal cavity, said piston partitioning said secondary internal cavity into a first chamber disposed adjacent to said first end of said secondary housing and a second chamber disposed adjacent to said second end of said secondary housing;

said second chamber containing a compressible fluid;

a flow regulator connected between said first chamber of said primary housing and said first chamber of said secondary housing, said flow regulator controlling a flow of said fluid between said first chamber of said primary housing and said first chamber of said secondary housing;

said flow regulator including a body which receives a flow control member;

said flow control member having a plurality of orifices of different sizes;

wherein said flow control member may be selectively positioned to cause said fluid to flow through one of said orifices from said first chamber of said primary housing to said first chamber of said secondary housing;

said body having an entry port and an exit port;

said flow control member including a cylinder having an outside surface and a plurality of bores, each said bore connected to said outside surface by one of said orifices;

wherein said cylinder may be selectively rotated so that one of said orifices aligns with said exit port, so that said fluid flows from said first chamber of said primary housing, through said entry port, through said bore connected to said aligned orifice, through said aligned orifice, through said exit port, and into said first chamber of said secondary housing; and, said flow regulator including a safety valve which opens allowing fluid to flow from said entry port to said first chamber of said secondary housing when said first chamber of said primary housing experiences a predetermined pressure level.

5. A shock absorber according to claim 4, further including:

said safety valve including at least one bypass washer which covers said bores;

wherein when said predetermined pressure level is reached, said bypass washer bends to allow said fluid to travel from said entry port through each of said bores and into said first chamber of said secondary housing.

6. A shock absorber, comprising:

a primary housing having a primary internal cavity containing a fluid, a first end, and an opposite second end;

a piston assembly disposed within said primary internal cavity, said piston assembly traveling within said primary internal cavity, said piston assembly partitioning said primary internal cavity into a first chamber disposed adjacent to said first end of said primary housing, and a second chamber disposed adjacent to said second end of said primary housing;

a shock rod connected to said piston assembly, said shock rod passing through said second end of said primary housing;

a secondary housing having a secondary internal cavity, a first end, and an opposite second end;

a piston disposed within said secondary internal cavity, said piston traveling within said secondary internal cavity, said piston partitioning said secondary internal cavity into a first chamber disposed adjacent to said first end of said secondary housing, and a second chamber disposed adjacent to said second end of said secondary housing;

said second chamber containing a compressible fluid;

a flow regulator connected between said first chamber of said primary housing and said first chamber of said secondary housing, said flow regulator controlling a flow of said fluid between said first chamber of said primary housing and said first chamber of said secondary housing;

said flow regulator including a body which receives a flow control member;

said flow control member having a plurality of orifices of different sizes;

wherein said flow control member may be selectively positioned to cause said fluid to flow through one of said orifices from said first chamber of said primary housing to said first chamber of said secondary housing;

said body having an entry port and an exit port;

said flow control member including a cylinder having an outside surface and a plurality of bores, each said bore connected to said outside surface by one of said orifices; and, wherein said cylinder may be selectively rotated so that one of said orifices aligns with said exit port, so that said fluid flows from said first chamber of said primary housing, through said entry port, through said bore connected to said aligned orifice, through said aligned orifice, through said exit port, and into said first chamber of said secondary housing;

said cylinder including a circular channel which connects said entry port with each of said bores;

a rotatable member connected to said cylinder;

a detent mechanism connected between said rotatable member and said body, so that, using said rotatable member, said cylinder may be selectively rotated to a flow position corresponding to one of said orifices, wherein said detent mechanism urges said cylinder to remain in said selected flow position;

a one way valve which permits said fluid to flow from said first chamber of said secondary housing to said first chamber of said primary housing; and, said flow regulator including a safety valve which opens allowing said fluid to flow from said entry port to said first chamber of said secondary housing when said entry port is exposed to a predetermined pressure level.

* * * * *